April 18, 1933.　　　K. W. GASKILL　　　1,903,758
GEAR SHIFTING MECHANISM
Filed June 19, 1931
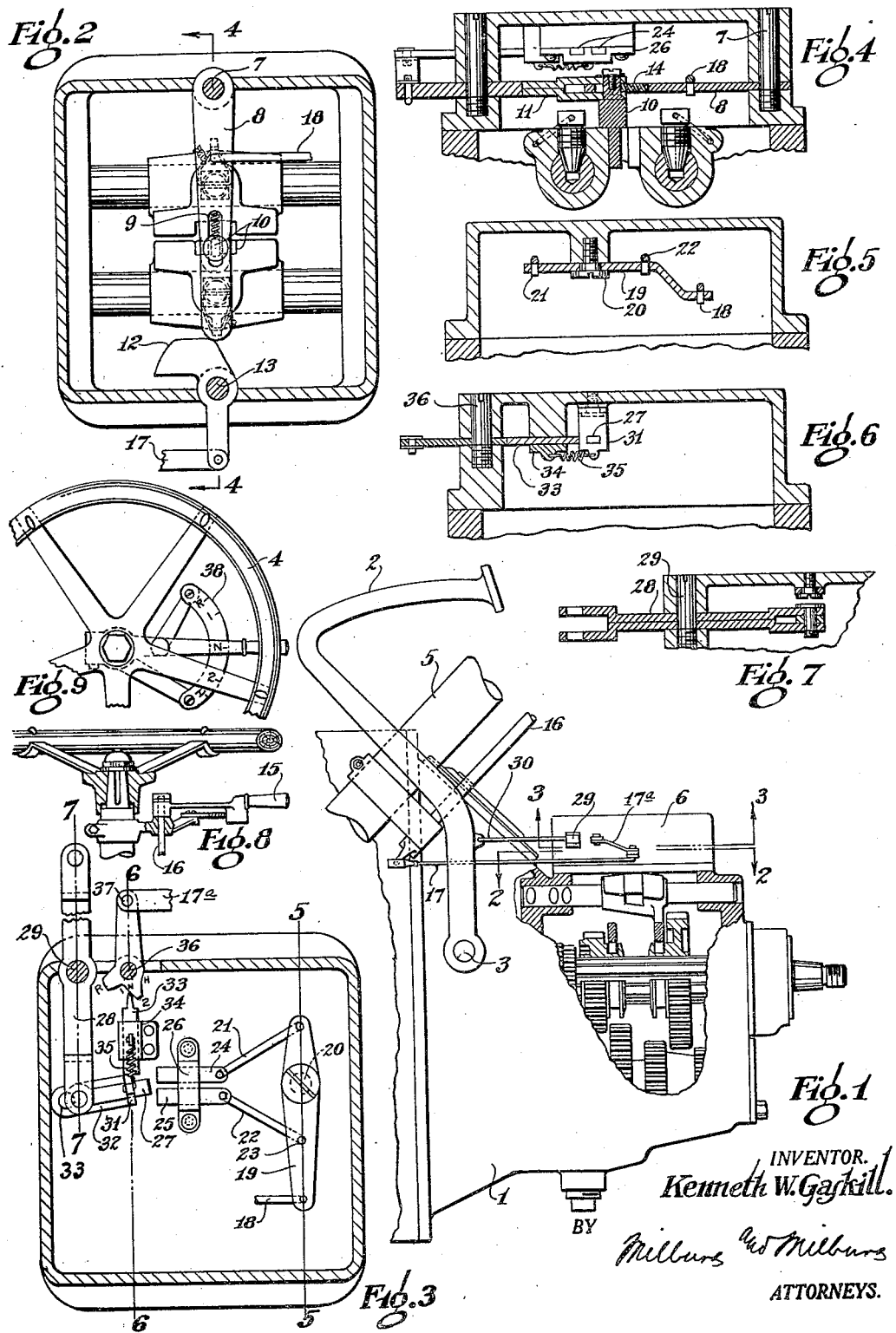
INVENTOR.
Kenneth W. Gaskill
BY
Milburn & Milburn
ATTORNEYS.

Patented Apr. 18, 1933

1,903,758

UNITED STATES PATENT OFFICE

KENNETH W. GASKILL, OF CLEVELAND, OHIO

GEAR-SHIFTING MECHANISM

Application filed June 19, 1931. Serial No. 545,573.

This invention relates to a gear-shifting mechanism adapted for use in connection with an automobile and is a continuation in part of my co-pending application, Serial No. 403,104, filed Oct. 28, 1929, and allowed March 28, 1931, Patent #1,820,452.

As explained in the co-pending application above referred to, the gears of the present standard form of automobile are shifted by first depressing the clutch pedal and then manipulating a hand lever for actually changing the gear ratio. In the present invention, this gear shift hand lever is entirely dispensed with and the gear ratio may be changed by depression of the clutch pedal as a continuation of the same operation employed for disconnecting the engine from the drive shaft, and in a general way, the same manner of operation obtains in the present case as in the co-pending application above referred to. That is, in the present invention also, there is provided an adjustable means within easy reach of the hand of the operator which can be set for any gear ratio desired and then upon depression of the clutch pedal, the change in the gear combination may be effected without the employment of any other lever.

Whereas, in the co-pending application above referred to, there is disclosed a device embodying hydraulic means for effecting the change in the gear ratio, the present improved form of device is purely mechanical.

It is therefore the object of the present invention to provide a gear-shifting mechanism in which a mechanical means is employed for first setting a selective means for determining the change to be effected in the gear ratio and in which there is provided a purely mechanical means for actually effecting such change in the gear ratio upon depression of the clutch pedal and without the employment of any other means.

A further object consists in devising such an improved form of gear-shifting mechanism which is of an extremely compact arrangement capable of being installed upon an automobile within an extremely restricted area.

Another object consists in devising such a mechanism which is of comparatively simple form and hence not costly to manufacture and not likely to get out of order.

Other objects will appear from the following description and claims when considered together with my accompanying drawing.

Fig. 1 illustrates in elevation the general assembly of my improved form of gear-shifting mechanism with part of the housing broken away to indicate the transmission; Figs. 2 and 3 are views taken on lines 2—2 and 3—3, respectively, of Fig. 1; Fig. 4 is a view taken on line 4—4 of Fig. 2; Figs. 5, 6, and 7 are views taken on lines 5—5, 6—6, and 7—7, respectively, of Fig. 3; Fig. 8 is a vertical sectional view of part of the steering wheel showing the manual means of adjustment for setting the mechanism for the gear ratio desired; and Fig. 9 is a plan view of the same.

It is to be understood that the present disclosure is merely for purposes of illustration and that other variations and modifications may be made without departing from the spirit of the present invention as herein set forth and claimed.

The present invention is here illustrated in connection with the present standard form of gear shift embodying the transmission casing 1, in which are enclosed the gear combinations usually referred to as first or low gear, second or intermediate gear, and third or high gear, as well as reverse gear and neutral. The positions of the several gears embodied in the transmission are the same in the present case as in the standard form of gear shift and are therefore not here fully illustrated.

In the present construction, there is provided the clutch pedal 2 which is pivoted at the point 3 in the usual manner. The regular form of steering wheel is indicated by reference numeral 4 with the steering post 5.

The entire gear-shifting mechanism in the present case is enclosed within the substantially flat and comparatively small casing or housing 6 which is positioned directly above the transmission and is preferably attached to the top of the transmission casing. The casing or housing 6 is of such small dimensions as not to interfere with or require re-arrangement of any other parts of the automobile construction. As will later be explained, the gear shift mechanism is operated by depression of the clutch pedal 2 which is operated in the usual manner.

Pivotally mounted in the wall of the housing 6 at the point 7 is the arm 8 which has its free end slotted, as indicated by reference numeral 9 and through which extends the correspondingly elongated pin 10. The lower end of the pin 10 is adapted to actuate the gears in actual shifting of the same, as will be understood. This pin is mounted at its upper end in the forked inner end portion of the arm 11 which receives the free end portion of the arm 8, while the other end of the arm 11 is adapted for engagement and actuation along a straight line by the cam 12 which is of flattened, elongated form and is pivotally mounted at the point 13 in the wall of the housing 6. The elongated or flattened form of pin 10 maintains the arms 8 and 11 in alignment, and there is sufficient clearance to accommodate the elongated pin 10 as lever 8 is operated. While the engagement of the cam 12 with the one end of the arm 11 is adapted to move the pin 10 from the left side to the right side of the gear combination in the transmission, there is provided a spring 14 which is located in slot 9 and is attached at its one end to the upper end of the pin 10 and is attached at its other end to the end of the slot 9. The tendency of the spring 14 is to return the pin 10 to its original position upon the left side of the transmission. The mechanism thus far described constitutes the means for adjusting the pin 10 laterally across the transmission and as will be seen, this adjustment may be effected by means of a hand lever 15 which is mounted upon the steering column at a point conveniently adjacent to the steering wheel and which has operative connection with cam 12 through the levers 16 and 17.

The means for effecting longitudinal adjustment of the pin 10 for shifting the gears, comprises the rod 18 which is attached at its one end to the pivoted arm 8, this rod 18 being connected at its other end to the one end of the lever 19 which is pivotally mounted at the point 20. Pivotally connected at the other end of the lever 19 is the rod 21 while the companion rod 22 is pivotally connected to the lever 19 at the point 23 which is between the pivotal point 20 and the point of pivotal connection of the rod 18. The rods 21 and 22 extend inwardly toward each other and are connected pivotally at their other ends to the bars 24 and 25 which are adapted for movement in suitable slide-ways provided in the member 26 which is attached to the casing 6. The bars 24 and 25 extend parallel to each other and are spaced apart a slight distance so that either one or both of these bars may be engaged by the plunger member 27.

The plunger 27 is pivotally connected to the lever arm 28 which is rotatably mounted at the point 29 in the wall of the casing. The other end of the lever arm 28 is pivotally connected to the rod 30 which is connected at its other end to the clutch pedal 2 at the proper point thereof for operation in the manner herein set forth. That is, these parts are so constructed and arranged that upon depression of the clutch pedal, the clutch will be first disconnected and then the mechanism herein disclosed will be operated so as to effect the intended change in the gear ratio. In this way, it is possible to depress the clutch pedal to a partial degree and then release the same without effecting a change in the gear ratio in case the operator should decide not to make such change in the gear ratio after he has initiated the depression of the clutch pedal.

The plunger 27 extends through an eye 31 on the end of the member 32 which is pivotally mounted at the point 33 in the casing. The member 32 extends parallel and in close proximity to the plunger 27. The eye 31 is adapted to bear against the plunger member 33 which extends through the guide-way 34 and is normally drawn toward the same by means of the spring 35 which is connected at its one end to the eye member 31 and is anchored at its other end to the guide-way 34. The engaging surfaces between the eye member 31 and the end of the plunger member 33 are beveled as indicated in Fig. 3, so as to prevent accidental disengagement between these parts at this point. The other end of the plunger member 33 is reduced to a comparatively pointed form and bears against the surface of the cam member which is pivotally mounted in the wall of the casing at the point 36. This cam member is of a particular conformation so as to afford proper projections and depressions for engagement with the pointed end portion of the plunger member 33 so as to properly position this plunger member preparatory to effecting the different changes in the gear ratio. That is, actuation of this cam member serves to project the plunger member 33 outwardly or to permit the same to be retracted by the spring 35 so as to thereby place the plunger member 27 in proper alignment with either of the members 24 and 25 so as to engage the same individually or in such position that the plunger 27 will engage both of the members 24 and 25, as indicated in Fig. 3, when it is desired to bring the gears to neutral position. The cam member is extended at the other side of its pivot point 36 so as to have pivotal operative connection at the point 37 with the operating levers 17 and 17ª so as to be actuated by the same manual adjustment which is performed in connection with the cam 12, as above explained.

The manner of operation will now be described. When it is desired to start the automobile in first or low gear, the lever arm 15 is set in such position as indicated upon the rack 38 and as a result of such adjustment, the cam 36 will be moved about its pivot so as to permit the plunger member 33 to engage the cam at the point indicated by the number 1 upon the cam. Such movement of the plunger member 33 is caused by the spring 35 which forces the eye member 31 in such direction against the plunger member 33. In this way, the plunger 27 is caused to assume position in substantial alignment with the member 24. At the same time and by the same adjustment of the lever 17, the cam 12 will cause lateral movement of the pin 10 so as to properly position the same upon the right side for the contemplated change in the gear ratio. Then upon depressing the clutch pedal, the plunger 27 will engage the member 24 and cause the lever 19 to turn about its pivot 20 in clockwise direction, as viewed in Fig. 3, and cause corresponding movement of the rod 18 so as to turn the arm 8 about its pivot 7 and thereby move the pin 10 forwardly into low gear position. Upon release of the clutch pedal 2, the gear ratio thus established will continue until further adjustment is made.

Then in order to establish second or middle gear ratio, the lever arm 15 will be adjusted accordingly with respect to the rack 38 and thereby the cam 36 will be adjusted so as to cause the same to project the plunger member 33 and will thereby cause the plunger 27 to assume position in alignment with the member 25. At the same time and by the same adjustment, the cam 12 is turned in the opposite direction and the spring 14 will cause pin 10 to be moved laterally to the left side of the transmission. Then upon depressing the clutch pedal, the plunger 27 will engage the member 25 and cause the lever arm 19 to turn about its pivot in counter-clockwise direction, as viewed in Fig. 3, and to thereby turn the arm 8 about its pivot and move the pin 10 rearwardly into middle gear position.

Then in order to establish high gear ratio, the lever arm 15 will be set in proper position so as to adjust the cam 36 accordingly and thereby cause the plunger 27 to assume position in alignment with the member 24. Such adjustment of the cam 12 does not involve any movement of pin 10 which is therefore permitted to remain upon the left side of the transmission. Depression of the clutch pedal will then cause actuation of the member 24 by the plunger 27 so as to turn the lever 19 about its pivot in clockwise direction, as viewed in Fig. 3, and to thereby cause the arm 8 and the pin 10 to be moved forwardly so as to assume high gear position.

Reverse gear can be established by proper adjustment of the lever arm 15 which causes the cam 36 to assume proper position and to likewise extend the plunger 33 so as to place the plunger member 27 in alignment with the member 25. Such adjustment as in the case of adjustment for low gear, causes the cam 12 to move the pin 10 laterally to the right side of the transmission. Then upon depression of the clutch pedal, the engagement of the plunger 27 with the member 25 will cause the lever 19 to turn in counterclockwise direction, as viewed in Fig. 3, and to thereby move the arm 8 and pin 10 rearwardly to reverse gear position.

In order to bring the gears into neutral position, the lever arm 15 will be set in proper position so as to position the cam 36 at the point indicated in Fig. 3. Such adjustment causes the plunger 27 to assume neutral position with respect to the members 24 and 25. At the same time, the cam 12 is turned to the position indicated in Fig. 2, and the spring 14 causes pin 10 to assume the position indicated. Then upon depression of the clutch pedal, the plunger 27 will bring the members 24 and 25 to neutral position and likewise the lever 19, as indicated in Fig. 3, as well as the gears controlled thereby.

Thus, it will be seen that any gear ratio may be established in the transmission without the employment of the present-day gear shift lever but merely upon adjustment of the lever arm 15 and depression of the clutch pedal.

Furthermore, the present form of mechanism is of a comparatively simple and compact form which may be installed upon an automobile without requiring re-organization of the conventional form of transmission and without involving great expense.

What I claim is:

1. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, cam means operatable through a fixed plane for effecting said lateral adjustment, mechanical means operatively connected to the clutch control for transmitting energy from the clutch control to said first-named means, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite direction.

2. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, cam means operatable through a fixed plane for effecting said lateral adjustment, lever mechanism operatively connected to the clutch control for transmitting energy from the clutch control to said first-named means, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite directions.

3. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, cam means operatable through a fixed plane for effecting said lateral adjustment, lever mechanism operatively connected to the clutch control for transmitting energy from the clutch control to said first-named means, said lever mechanism including a compound lever and an adjustable lever for positioning in relation thereto so as to actuate the same in either direction, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite direction.

4. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, lever mechanism operatively connected to the clutch control for transmitting energy from the clutch control to said first-named means, said lever mechanism including a compound lever and arms extending therefrom for actuation of said lever in either direction and an adjustable lever for positioning in relation thereto so as to actuate the same in either direction, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite direction.

5. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, means for effecting said lateral adjustment, mechanical means operatively connected to the clutch control for transmitting energy from the clutch control to said first-named means, said mechanism including an arm pivoted between its ends, means connecting its one end to said first-named means, said arm being provided at points upon opposite sides of the pivot point thereof and at equal distances therefrom with companion arms for actuation thereof, said companion arms extending in adjacent arrangement, an adjustable plunger arm adapted to occupy position for engagement with either of said companion arms so as to move said one end of said pivoted arm in either direction, and means for effecting adjustment of said plunger arm simultaneously with the lateral adjustment of said first-named means and in accordance therewith.

6. In a device of the class described, the combination of an engine, a shaft adapted to be driven thereby, a clutch connection and gear transmission between said engine and shaft, means operatively connected to said gear transmission for effecting change in the gear ratio, said means being capable of lateral adjustment according to and preparatory to the change desired in the gear ratio, means for effecting said lateral adjustment, mechanical means operatively connected to the clutch control for transmitting energy from the clutch control to said first-named means, said mechanism including an arm pivoted between its ends, means connecting its one end to said first-named means, said arm being provided at points upon opposite sides of the pivot point thereof and at equal distances therefrom with companion arms for actuation thereof, said companion arms extending in adjacent arrangement, an adjustable plunger arm adapted to occupy position for engagement with either or both of said companion arms so as to move said one end of said pivoted arm in either direction, and means for effecting adjustment of said plunger arm simultaneously with the lateral adjustment of said first-named means and in accordance therewith.

7. In a device of the class described, the combination of an engine, a shaft adapted to be driven thereby, a gear transmission between said engine and shaft, means operatively connected to said gear transmission for effecting change in the gear ratio, said means being capable of lateral adjustment according to and preparatory to the change desired in the gear ratio, cam means operatable through a fixed plane for effecting said lateral adjustment, means for effecting operation of said first-named means, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite direction.

8. In a device of the class described, the combination of an engine, a shaft adapted to be driven thereby, a gear transmission between said engine and shaft, means operatively connected to said gear transmission for effecting change in the gear ratio, said means including slidably connected lever members capable of lateral adjustment according to and preparatory to the change desired in the gear ratio, cam means operatable through a fixed plane for effecting said lateral adjustment, means for effecting operation of said first-named means, adjustable means for establishing proper control connections according to the gear ratio desired and for simultaneously actuating said cam means for effecting adjustment of said first-named means laterally in one direction in accordance with the adjustment of said adjustable means, and means for automatically effecting lateral adjustment of said first-named means in the opposite direction.

In witness whereof, I hereby affix my signature.

KENNETH W. GASKILL.